Aug. 27, 1957 — O. K. KELLEY — 2,803,974
FOUR PHASE CONVERTER DRIVE
Original Filed July 31, 1948 — 5 Sheets-Sheet 1

Inventor
Oliver K. Kelley
By
Spencer, Willits, Helwig & Baillio
Attorneys

Aug. 27, 1957 O. K. KELLEY 2,803,974
FOUR PHASE CONVERTER DRIVE
Original Filed July 31, 1948 5 Sheets-Sheet 3

Inventor
Oliver K. Kelley
By
Spencer, Willits, Helwig & Baillio
Attorneys

Aug. 27, 1957      O. K. KELLEY      2,803,974
FOUR PHASE CONVERTER DRIVE
Original Filed July 31, 1948      5 Sheets-Sheet 4
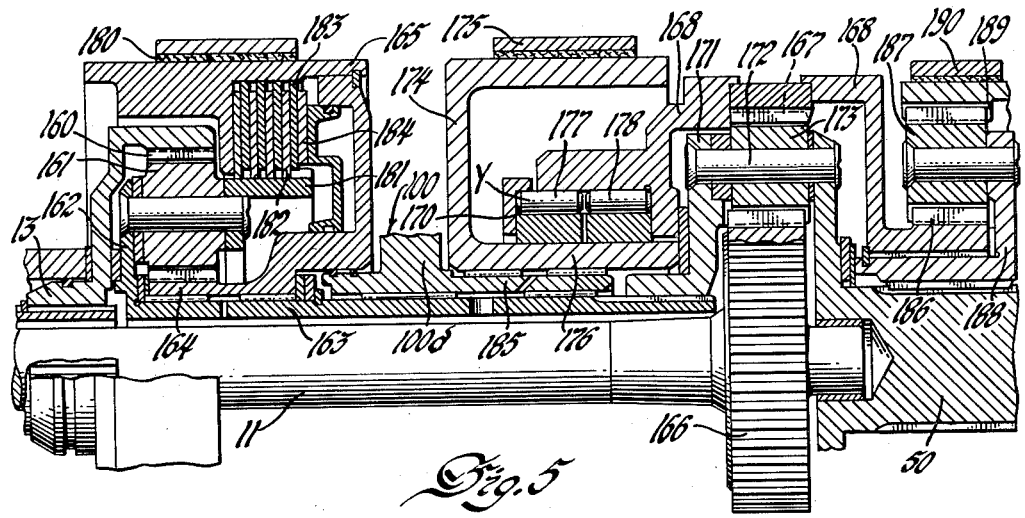

United States Patent Office 2,803,974
Patented Aug. 27, 1957

2,803,974

FOUR PHASE CONVERTER DRIVE

Oliver K. Kelley, Birmingham, Mich., assignor to General Motors Corporation, Detroit, Mich., a corporation of Delaware Continuation of application Serial No. 41,767, July 31, 1948. This application August 5, 1953, Serial No. 372,564

39 Claims. (Cl. 74—677)

The present application is a continuation of an application for Letters Patent Serial Number 41,767, filed July 31, 1948, now abandoned, entitled "Four Phase Converter Drive."

The present invention pertains to combined fluids turbine and gear drive mechanisms and in particular to those which embody a fluid torque converter capable of transmitting torque at various speed ratios.

It pertains likewise to such fluid torque converter and gear combinations in which auxiliary turbine output runners are independently connected to separate input gear train elements.

In the present invention, it is the purpose to teach a new principle of torque dividing through multiple fluid torque converter output power members, connected to plural gear train members, the gear train combination serving to recombine the torque components. It has been found that the above principle of operation enables the designer to take advantage of the plural ranges of torque converter output, which when combined with gear train elements, establish what in net effect is a much more efficient and wider over-all, effective speed ratio range, than obtained with other torque converter and gear combinations. It has been found that the invention described herein affords plural drive ranges which merge one into the next, without shock, while maintaining effective acceleration and performance.

It is believed that the principles demonstrated in the following specification and accompanying drawings provide novel and unexpected advantages in the driving of all types of vehicles. In the figures attached herewith:

Figure 1 is a vertical section in elevation.

Figure 3:
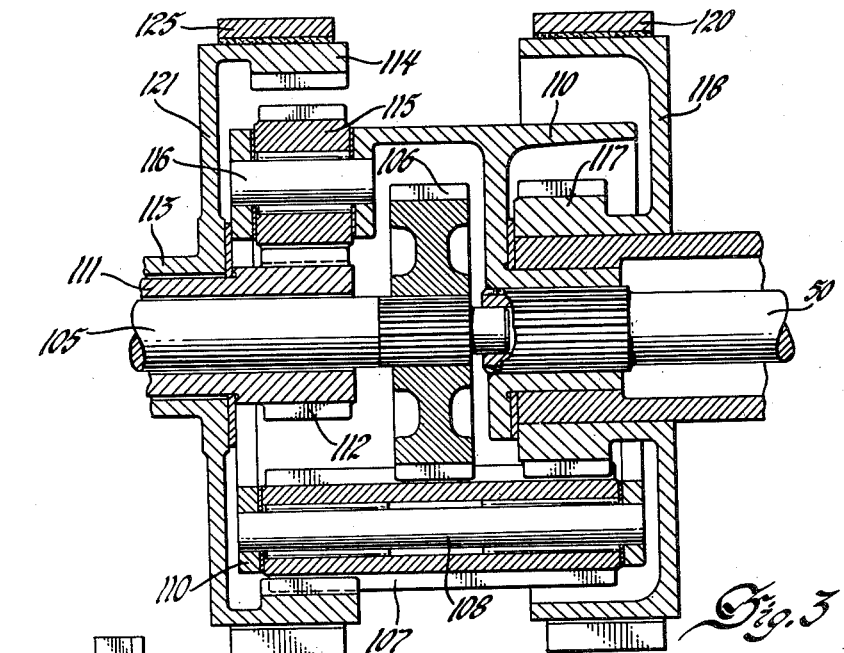
Figure 4:
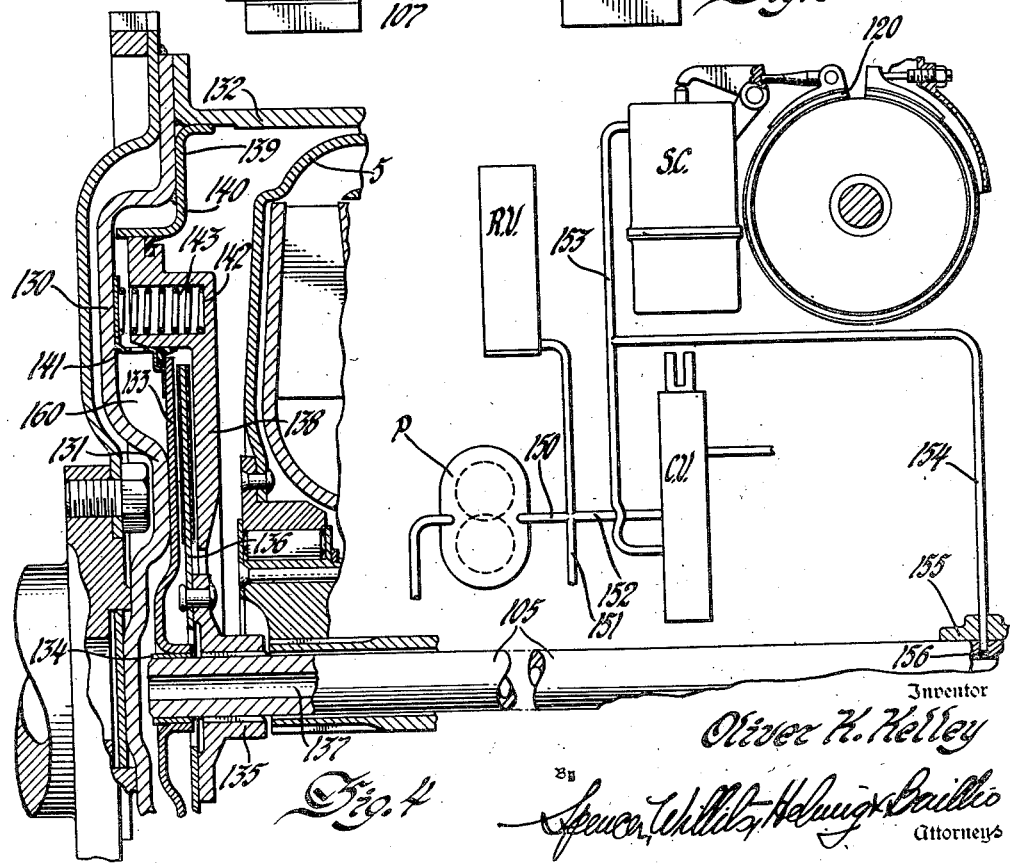

Figures 3 and 4, considered together, are sectional views of a gear train and a partly schematic drawing of the cooperating clutch and fluid pressure control system. This combination is a modification in which the top ratio coupling is obtained by inter-stage means.

Figure 1:
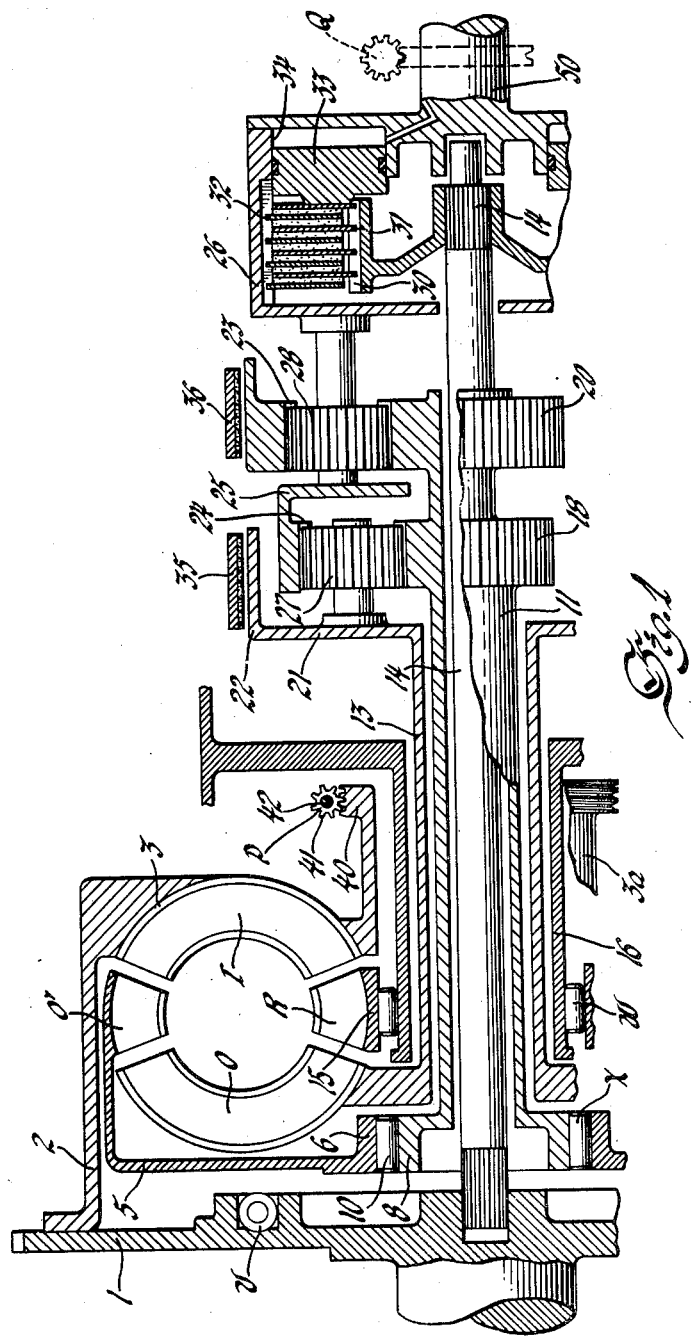
Figure 1 is a schematic representation of a combined fluid torque converter and gear train, which demonstrates the aforesaid principles and teachings.
Figure 2:
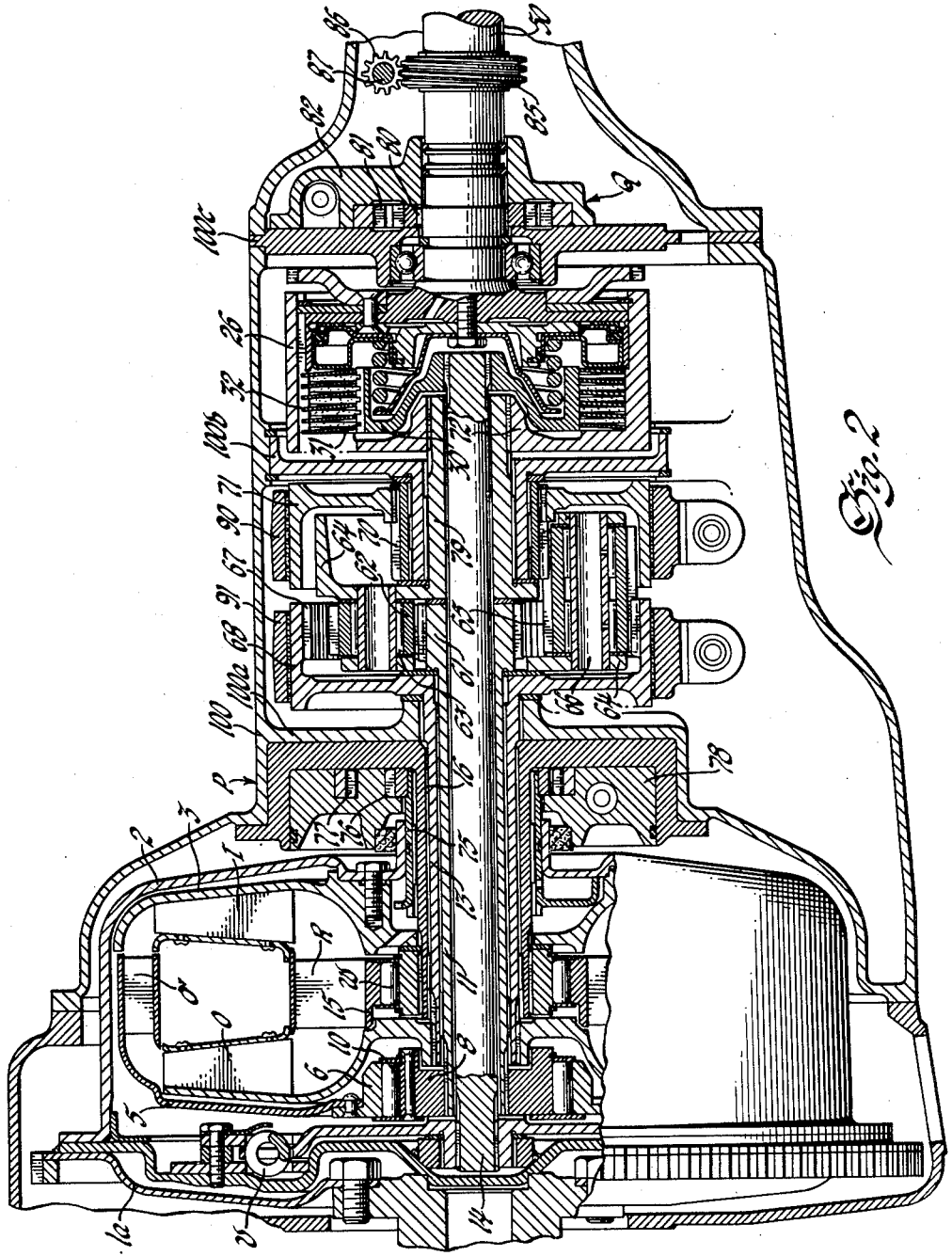
Figure 2 is a vertical section elevation of a motor car transmission built in accordance with the disclosure of Figure 1, but having a somewhat different gear train in the combination, as will be understood in detail further.

Figure 5 is a sectional elevation of a different gear train to be combined with the torque converter of Figures 1 or 2.

Figure 6 is a sectional elevation of a modification arrangement to that of Figure 2, wherein the direct drive clutch is of different form and location.

Figure 7:
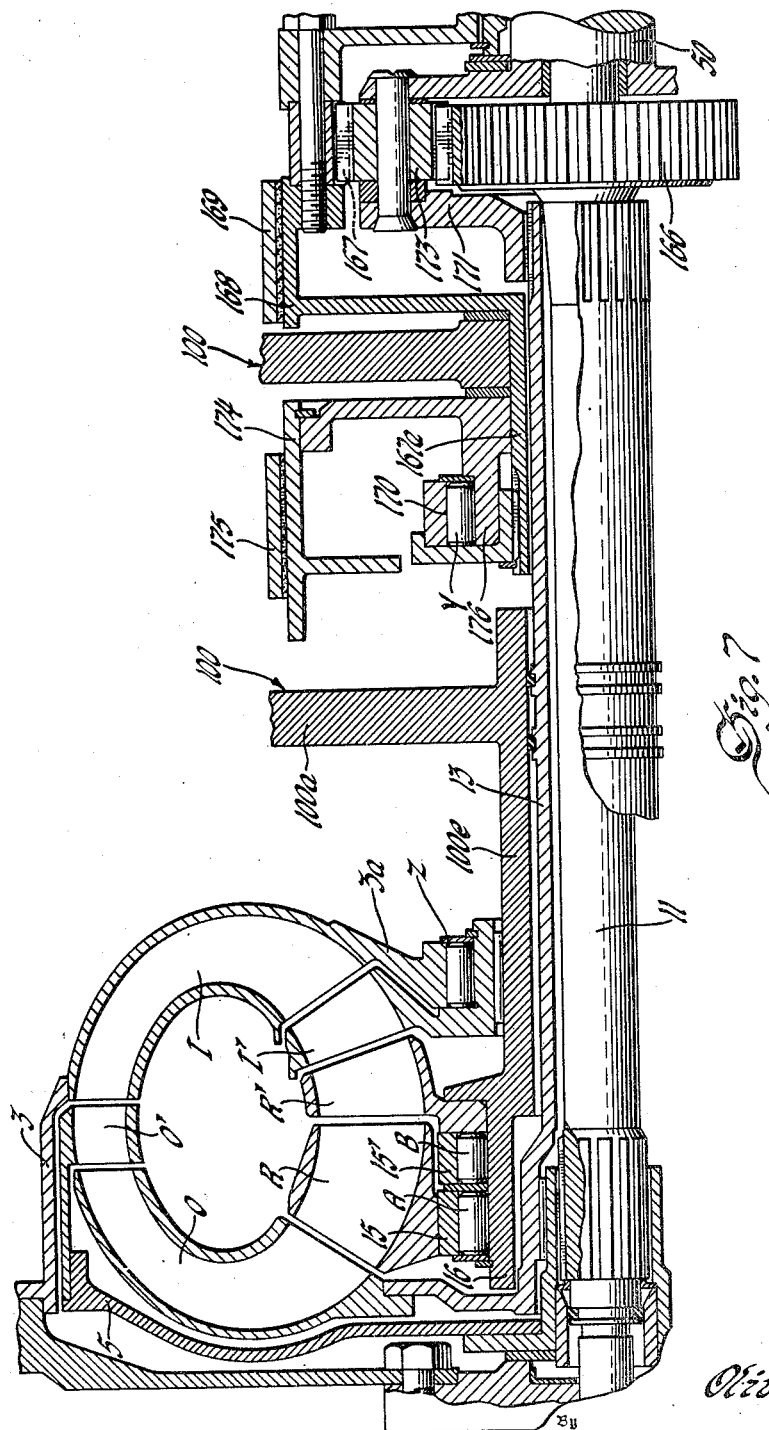

Figure 7 is a sectional elevation of a special purpose drive in which the auxiliary output rotor principle of Figures 1 and 2 is combined with a multiple impeller converter, a heavy-duty gear train being shown combined with the converter outputs.

The torque converter of the form shown in Figure 1, has a single impeller I in the outflow zone; an auxiliary runner O' adjacent thereto, in the outer radial zone; the main runner O in the inflow zone, and a single reaction rotor R in the inner radial zone.

The auxiliary O' runner is one-way clutched at X to the sun gear shaft 11 driving two sun gears 18, 20 of two coupled planetary units. The main runner O is attached to the carrier 21 of the front planetary unit.

The final drive or output shaft 50 is attached to the annulus 24 of the planetary front unit and to the carrier 25 of the rear planetary unit.

The annulus gear 23 of the rear unit is braked for low gear. The planetary front unit carrier 21 is braked for reverse drive.

The drive is direct coupled between the engine flywheel 1 and the output shaft 50 for direct drive.

With the "forward" brake 36 applied, the vehicle is put into motion by the high velocity rotation of the auxiliary runner O', the one-way clutch at X transmitting the torque. During this operation, the main impeller O is slowly driven, the two components being applied to the two sun gears 18—20 and the front unit carrier 21 respectively.

As the vehicle picks up in speed, the difference of speed between the input components becomes less, to the point where the force reactions cause the auxiliary runner O' to rotate more slowly than the sun gear shaft 11, whereafter the auxiliary runner O' idles. The drive from here on is converted to fluid flywheel operation, beyond which the direct drive clutch is connected, cutting out the slip drive by solid coupling of the shafts 14 and 50.

There are four drive phases:
a. Auxiliary rotor O' provides low range,
b. Main rotor O provides second range,
c. Converter goes to coupling stage,
d. Direct drive clutch gives 1–1.

In Fig. 1 the engine flywheel 1 is attached to drum 2 connected to the shell 3 of the impeller I. The runner O' is attached to drum 5, the hub 6 of which is formed as the outer member of one-way clutch X. The inner member 8 cooperates with rollers 10 arranged so that the drum 5 may transmit torque through unit X when the forward speed of the drum is higher than that of hollow shaft 11 to which the member 8 is fastened.

The runner member O is attached to the second hollow shaft 13. The central shaft 14 is coupled to the flywheel 1 thru the vibration damper unit V shown in Fig. 2 in detail. The reaction member R is attached to the outer portion 15 of the one-way brake unit W, the inner portion being fixed to non-rotating sleeve 16.

The arrangement of the torque converter members is believed novel in that the space locations of the four members have particular bearing on the useful result of the drive. It should be noted that the impeller I lies in the outflow zone, the first rotor O' in the outer radial zone, the second rotor O in the inflow zone and the reaction member R in the inner radial zone.

The advantages of this particular arrangement will be more readily apparent when the connections of the members to the gear elements are stated.

Hollow shaft 11 is fixed to, or integral with the sun gears 18 and 20 of the front and rear planetary gear units. The carrier 21 of the front unit is attached to the second hollow shaft 13, and is equipped with drum 22 for reverse braking. The rear unit annulus 23 is braked for forward drive, and released when the direct drive clutch is engaged at 31—32.

The front unit annulus gear 24 is fixed to the rear unit carrier 25, which in turn is attached to the output shaft 50 through clutch drum 26.

The front unit planet gears 27 mesh with 18 and 24, and the rear unit planet gears 28 mesh with 20 and 23. This gear is of a torque-combining type.

The central shaft 14 carries splined clutch hub 30 for plates 31, and mating plates 32 are attached to rotate with drum 26. Piston 33 recessed in cylinder 34 of drum 26 is fed fluid pressure to engage the direct drive clutch 31—32.

The drum brakes 35 and 36 for reverse and forward respectively are fluid-pressure loaded by a servo system to be described further.

The front pump P is driven from the drum 2 by gears 40, 41 and shaft 42. The rear pump Q is driven similarly from output shaft 50.

At standstill, with the engine flywheel 1 and shaft 14 rotating, the impeller I is rotated, providing idling circulation of the converter fluid. With neither of brakes 35 or 36 applied or loaded, nor clutch 31—32 engaged, there is no drive.

The controls are operated to admit fluid pressure to energize brake 36, stopping rotation of rear unit annulus 23. Acceleration by the engine by opening of the throttle causes impeller I to drive rotor O', transmitting torque through one-way clutch X and shaft 11 to sun gear 20, and the drive proceeds in low gear.

Rotor O under initial drive conditions is positively driven slower than rotor O' by the carrier 25. This is because the front unit annulus 24 is rotated forward at reduced speed with carrier 25, while the sun gear 18 drives the pinion 27.

As the car accelerates the fluid circulation of the converter begins to apply a larger torque to rotor O, which through carrier 21 tends to cause the sun gear shaft 11 to rotate faster than drum 5, at which the one-way clutch 6—8—10 releases the connection between shaft 11 and drum 5. This is the second drive phase.

The torque ratio through the low phase may start at a value ranging from 2.65 to 3.00, while in the second phase the torque ratio may range from 1.44 to 1.55 in actual practice, with the gearing shown.

With increased speed, the fluid drive changes to a fluid coupling, with the reaction wheel R ceasing to furnish torque multiplication and turning forward at approximately the same speed with the other rotors.

At higher speeds, the control mechanism releases band 36, and applies clutch 31—32 to connect input shaft 1 with output shaft 50.

Under overtaking torque, with the vehicle coasting and the engine throttle at idle, with clutch 31—32 released and band 36 applied, rotor O has sufficient flow capacity to start a stalled engine, although closing of clutch 31—32 will provide the same effect.

Drive in reverse is obtained by the applying of brake 35 to drum 22 with fluid pressure. This stops carrier 21, shaft 13 and rotor O. The drive of rotor O' causes sun gear 18 to rotate forward and through planet gears 27 cause annulus 24, member 25, drum 26 and shaft 50 to rotate reversely.

Due to the fact that the fixed ratio relationships within the gear train compel a given differential of speed between shafts 11 and 13, the converter rotors O' and O, connected to drive these shafts respectively, are required to rotate differentially over given speed ranges, except as the one-way clutch at X can disengage rotor O'.

Let it be assumed that the output shaft 50 is the driver, and that brake 36 is applied. If there were no other considerations, the carrier 25 would drive the mechanism first through the train 23, 28, 20, to spin shaft 11 at a given overspeed; however, the carrier 25 is also driving the annulus gear 24, so that the reaction of the drive through the train 24—27—18 results in a component being delivered to the carrier 21. It must be remembered that sun gears 18 and 20 are fixed together.

The component applied to shaft 11, by reason of the dimensions of the gearing, is at a higher speed than that delivered to shaft 13.

Now, assuming drive by impeller I, for a given load condition on shaft 50, the rotor member in transmitting drive to the sun gears 18—20, also causes carrier 21 and shaft 13 to rotate forwardly at a slower speed than shaft 11.

For a given circulation velocity of the converter, rotor O' may normally rotate faster than rotor O. The auxiliary rotor O' is bladed for axial flow, so that it may freewheel without loss, over the whole cycle of main rotor performance.

The rotors O' and O have differing torque absorption characteristics due in part also to their position in the working space. At high velocities, O' is able to transmit more torque than O, therefore under initial drive from idling condition, O' drives the sun gears 18—20, and consequently, through the gear train, the output shaft 50.

As a further factor in this consideration, the gear train, when driving, as noted above, requires O to have a definite rotation slower than that applied to the shaft 11 and sun gears 18—20.

With rise of car speed, or speed of shaft 50, carrier 25, and annulus 24, the rotors O and O' now having higher net speeds of rotation, causes the circulating velocity in the converter to diminish, and rotor O' is unable to deliver sufficient torque to keep up with the speed ratio enforced by the dimensions of the gear train elements, hence it is permitted to idle by the freewheel device at X.

In further explanation of this drive phase shift effect, with a given engine input torque to impeller I, a high circulation velocity is reached when rotors O' and O are stationary. At high circulation velocity rotor O' absorbs the major part of the energy while the lesser part is adsorbed by O, since O' and O are required to rotate in relation to the fixed ratio as set by the gear train. O' being the faster rotating member drives only as long as the circulating fluid velocity permits. When the speed of O' increases, more of the energy from I is transmitted to O, and with the gear train requiring that O' always run faster than O there comes a time when the speed of O' is faster than the fluid velocity is able to drive it. At this time the faster spinning shaft freewheels and the entire energy is transmitted to O, and O' idles in the fluid path and offers no resistance to the fluid velocity, because of its axial flow blading, in which the radial dimensions at inlet and outlet are equal.

Speed and torque both, for both rotors, is dependent upon circulation velocity.

With falling off of circulation velocity the speed of O' drops below the sun gear speed which latter is determined by the fixed gear ratios as driven by rotor O, which continues to drive.

These considerations should be carefully examined for a full understanding of the peculiar properties of the various modification disclosures following hereunder, as well.

This specification in referring to "torque combining gear trains" is meant to denote those in which there are plural input members which deliver individual torque fractions to the train which resolves them into a single output torque applied to a single member. The present gear trains of the construction herein, are of that category. For example, in Fig. 1 shaft 11 delivers one torque fraction to sun gears 18 and 20, and shaft 13 another torque fraction to carrier 21. These fractions are combined by the gearing relationships, and applied to the output shaft 50 from carrier 25 and annulus gear 24.

Under initial torque conditions the load holds shaft 50 of Fig. 1, drum 26, carrier 25 and annulus gear 24 stationary. With annulus gear 23 stopped by brake 36, any torque applied to the sun gear 20 will be multiplied to rotate carried 25 and drum 26 at a low gear speed. The sun gears are tied together and the rotation of their shaft 11 applied to the sun gear 18 tends to drive the carrier 21 at a reduced speed, which speed is applied to shaft 13 and rotor O. This condition continues to prevail during increased rotation of the output-connected elements 50, 25 and 24, and since 24 in rotating instead of standing still, applies an increasing speed to carrier 21, rotor O can be considered to be spun by the gear train reaction out of torque-accepting speed, as long as rotor O' delivers torque to the sun gear shaft 11.

Because of its location in the outer radial zone wherein the fluid body has its greatest charge of kinetic energy, the rotor O' has only a limited ability to accept torque, or it may be said that its torque capacity for a given speed range is low. During the rise of speed of impeller I the circulating velocity of the fluid body increases, and being strategically located in the inflow zone the rotor O beings to absorb torque at an increasing value, tending to drive carrier 21 at an increasing speed ratio. Eventually the reflection of this torque through the sun gears and shaft 11 causes shaft 11 to run forwardly faster than rotor O' and the one-way clutch 6—10—8 releases.

In Figure 2, at the left the driving element 1a is connected to drum 2 and to input rotor I in the same manner as in Figure 1. The auxiliary rotor O' is coupled through freewheel clutch 6—8—10 to shaft 11, through drum 5. The output rotor O is attached to shaft 13, and the reaction vane member R is prevented from backward rotation by one-way brake reactor W located between the inner portion of the rotor 15 and the non-rotating sleeve 16 which is attached to a web of the external housing 100. The central shaft 14 is coupled with the input member 1a through the vibration dampening device V, and at the right hand is connected to clutch hub 30 carrying plates 31 mating with the plates 32 carried on drum 26 which is fastened to the output shaft 50.

The gear train herein consists of sun gear 61 attached to shaft 11, meshing with planets 62 carried on spindles 63 supported in carrier 64. Planets 62 mesh with planets 65 mounted on spindles 66 in carrier 64, and annulus gear 67 meshes with the planets 65, the drum 68 being connected to shaft 13.

Sun gear 70 meshes with the planets 65 and is attached to drum 71. The inner portion of the carrier 64 extends to the right where it is splined to the web 72 of drum 26 which rotates with the output shaft 50.

An extension 75, attached to drum 2, drives the input gear 76 of pump P, meshing with idler gear 77, supported in the pump body 78, which is machined to fit the leftward face of the radial extension of sleeve 16. The pump P is connected to maintain a positive pressure in the working space of the torque converter at the left.

A similar pump Q at the rear of the transmission consists of driving pump gear 80 and idler gear 81 located inside pump body 82 machined to fit the rearward face of the casing web 100c.

The gear 85 fixed to shaft 50 drives gear 86 and shaft 87, for the purpose of operating any speed responsive mechanism required such as a speedometer.

It will be observed that in direct drive the clutch 31—32 directly connects the output shaft 50 with the shaft 14, the latter shaft rotating with the engine connected member 1a, through the coupling of the vibration dampener V.

When the drum 71 is held by brake 90, the sun gear 70 is prevented from rotating, and therefore the sun gear 61 provides initial drive, resulting in the rotation of output shaft 50 by the drive of carrier 64 which through web 72 drives drum 26 connected to the shaft 50. With the rise of output shaft speed, and diminishing of the circulating velocity within the converter, the output rotor O drives the annulus gear 67, the resultant freewheeling of the shaft 11 and sun gear 61 being permitted by the one-way clutch 6—8—10; while the carrier 64 now drives the output shaft at higher geared ratio. At a predetermined circulating velocity and differential speed relationship between the input and output members of the converter I and O, the reaction rotor R passes through a condition of zero reaction torque, and is caused to rotate forward with increased speed, which action is permitted by the reaction one-way brake W, the converter members, I, O, O' and R eventually revolving at approximate one-to-one ratio. This is the third phase of the operation of the device. The final phase occurs when the brake 90 is released, simultaneously with the loading of the direct drive clutch 31—32, as in the case of Fig. 1.

Reverse drive is obtained by locking the brake member 91 about the drum 68, which establishes a reverse drive reaction at annulus gear 67, resulting in reverse rotation of carrier 64 from that of the input driving sun gear 61 driven by shaft 11 from rotor O'. It should be noted that with annulus gear 67 held and with the sun gear 61 having one hand of rotation, the planet gear 65 is required to roll around the inside of annulus gear 67 so that carrier 64 revolves reversely to the direction of rotation of sun gear 61, which action resembles that of the commonly known marine reverse gear.

The above two versions of the invention embody the use of a direct drive clutch which couples the engine directly with the final output shaft. It is desirable under certain operating conditions to be met, to utilize a somewhat different coupling arrangement, in which the direct drive clutch will establish an internal driving couple, rather than directly connecting the input and output torque sustaining members. For this purpose Figs. 3 and 4 are provided.

Figure 3 represents a gear train having three input members, one output member, and two controlled reaction members.

The solid shaft 105 at the left is attached to sun gear 106 meshing with planet gear 107 mounted on spindles 108 in carrier member 110 splined to the output shaft 50. The hollow shaft 111 is attached to sun gear 112, and the hollow shaft 113 is attached to the annulus gear 114. The planet gears 115 mounted on spindles 116 in the carrier 110, meshes internally with the sun gear 112 and externally with the planet gears 107.

At the right, sun gear 117 meshes with the planet gears 107 and is attached to drum 118 which is braked by band 120. At the left the drum 121 of the annulus gear 114, connected to shaft 113 is braked by band 125.

Referring now to Figure 4 the engine crankshaft is shown connected to the converter cover plate 130 which through drum 132 drives the impeller I of Figs. 1 or 2. The plate 130 is indented at 131 in a succession of coplanar portions for attaching to the clutch backing plate 133, the inner portion of which has bearing sleeve 134 surrounding the stub end of shaft 105. The shaft 105 is splined to accommodate the hub 135 for clutch plate 136, and the drilled passage 137 opens into the space to the right of the plate 130 for a purpose to be described in detail further. The movable clutch pressure plate 138 is supported in the members 139 and 140, and in the member 141 attached to the plate 130 for axial movement, and is recessed at 142 for springs 143 which normally tend to release the clutch. It will be observed by comparison with the structure of Fig. 3, that when the clutch 133—136—138 is engaged, the engine torque is transmitted directly to sun gear 106 for coupling the planet gears 107. As will be understood further this clutch engagement control is devised to provide direct drive, when the torque converter is running in its approximate one-to-one ratio.

In the diagram at the right, is shown a schematic representation of the pump P which provides 80 pounds line pressure for example through the action of a regulator valve RV, this pressure going to a control valve CV, and to a passage for maintaining the working space of the torque converter under static pressure, less the normal leakage from the turbine space.

The pump output passage is 150, and the converter feed passage is 151, the passage 152 leading to the control valve. The passage 153 connects to the cylinder for the servo actuation of the rear unit brake band 120, which may be similar to that shown in Fig. 2 of my Letters Patent U. S. 2,176,138, which issued October 17, 1939. A branch passage 154 is connected through a gland 155 and radial passage 156 to the central feed passage 137 in the shaft 105. When the control valve delivers line pressure from the pump P to the space 160 to the left of the pressure plate 133 of Fig. 4, and when the pump pressure is being simultaneously delivered through passage 151 to the right of the pressure plate 138, a pressure balance condition is obtained on either side of the pressure plate such that the springs 143 may release the clutch. It will be noted that under this circumstance, the pressure delivered by the control valve to the servo cylinder SC for the rear unit band 120 is applying the band 120 for the purpose of stopping the rotation of the sun gear 117 for establishing the low gear drive of gear unit of Fig. 3. However, when the control valve is moved to release the pressure from the servo cylinder, and likewise from the pressure chamber 160, a static pressure head within the converter compartment applies the pressure plate 138 to grip the clutch plate 136, for establishing the direct coupled drive. This enables the drive pattern as controlled by the control valve CV to provide extremely smooth shifts to and from the fourth phase of operation, with a very simple on and off control. It seems to be novel to utilize the static pressure head for applying the direct coupling clutch, and to utilize the pressure derived from the same source to counterbalance the static pressure for releasing the clutch.

The gear train of Fig. 5 has two forward drive planetary gear units. The first or front unit has input annulus gear 160 connected to shaft 13 of the main output rotor O of Fig. 2, planet gears 161 journalled on carrier 162 in turn connected to hollow shaft 163, and sun gear 164 connected to reaction drum 165.

The second or rear unit has sun gear 166 mounted on shaft 11, annulus gear 167 attached to drum 168 having roller clutch member 170 formed inside the overhang, and carrier 171 supporting the spindles 172 of planet gears 173. The carrier 171 is joined to shaft 163 connected to carrier 162 of the front unit. The shaft 11 is connected to the auxiliary rotor O' of Fig. 2.

Reaction band 175 is adapted to stop drum 174 having an inner axial extension forming the other member 176 for the one-way reaction clutch at Y. Conventional rollers are shown at 177, 178. Reaction band 180 is adapted to stop drum 165 of the sun gear 164 of the front unit.

The drum 168 is webbed at the right to support sun gear 186 of the reverse unit, the meshing planets 187 being spindled on carrier 188 also attached to output shaft 50. The annulus gear 189 is braked by band 190 for reverse drive.

This gear train is essentially that of Letters Patent No. 2,430,258, Figure 5, issued to Earl A. Thompson, November 4, 1947, with the coupling clutch for the rear unit omitted. The gear train is likewise shown in the present applicant's Letters Patent U. S. 2,377,696, Figure 1, issued June 5, 1945.

The Fig. 5 arrangement was developed for special purpose drive mechanism. The brake band 175 and drum 174 may be eliminated, and the hub 176 connected directly to drum 165 of the front gear unit. With this arrangement, the band 180 provides initial drive reaction and is effective during intermediate converter drive, the clutch 182—183 serving to establish the gear-locking-couple across 167—171 for one-to-one gear unit ratio. For reverse band 190 is applied with band 180 released. The band 175 in Fig. 5 as shown is available for separate sustaining of the reaction torque assumed by the plural one-way clutches at Y. The novel use of two one-way clutches, phased alike, and in parallel enables the designer to compress a high torque capacity in a small space.

The operation of the forward driving gear train of Fig. 5 in connection with the torque converter of Fig. 2 is similar to that of the structures hereinbefore described of Figs. 1, 2 and 3. In the present case, the initial torque of the auxiliary rotor O' drives shaft 11, applies torque through sun gear 166, and since the one-way roller clutch at Y is phased to lock under a backward component, the application of band 175 to drum 174 and band 180 to drum 165 constitutes the master control for initial low range drive.

When the rotor O supercedes rotor O' in delivering the converter torque, shaft 13 through the reduction of the front unit drives shaft 163, to drive the output shaft 50 through the carrier 171, at which time the one-way reaction clutches at Y release and the rear unit drives at unit speed with shaft 163.

The front unit carrier 162 is extended at the right to form a mounting hub 181 for clutch plates 182 mating with plates 183 carried on the inner portion of drum 165, the piston 184 being applied by fluid pressure delivered through appropriate passages leading from non-rotating gland 185 supported by web 100d of casing 100.

The release of band 180 and application of clutch 182, 183 releases the drum 165 and locks the carrier 162 to the sun gear 164, causing the front unit to drive at one-to-one, therefore the converter rotor O may drive shaft 163 at unit speed, and consequently the output shaft 50.

When the converter goes to its top ratio phase with speed increase, and its reaction rotor R ceases to receive a backward component, the drive goes to top ratio.

This arrangement provides the novel overlap of the auxiliary rotor and main rotor phases by virtue of the action of the reaction clutches at Y in permitting automatic locking and release of the annulus gear 167, as differing somewhat from the action of the one-way clutch at 6—8—10 in Figs. 1 to 3.

The combining ratio effect of locking band 190 on the drum of annulus gear 189 upon the drive, when sun gear 166 alone is driving, is to impart a backward rotation to the shaft 50. However this effect is only obtained during the interval when the auxiliary rotor O' is transmitting torque since if the rotor O imparts a forward torque component to shaft 13, which could be converted or transmitted by the front unit to shaft 163, the magnitude of the reverse component delivered to the shaft 50 would be diminished. It is normally desirable that band 180 and clutch 182, 183 of the front unit be both released for reverse drive, so that rotor O cannot be coupled to load torque. Another consideration is that for reverse drive, drum 168 and sun gear 186 are to be rotated reversely, therefore the one-way reaction clutches at Y must be free to permit 168 to so rotate, therefore band 175 is required to be released.

The above-noted effect of diminished reverse couple upon rise of rotor torque sufficient to deliver an increasing forward component to the combining gear, is usable where required to limit the speed at which the driver may force his car to reach in reverse. This appears to be a novel and useful principle, in designs of drives developed, for maximum safety factor in operation. It also limits abuse of the mechanism.

A further novel combination is available as in Fig. 6, from the figures herein presented, alternative to the disclosure of Fig. 2 which shows the direct drive clutch 31—32 located inside the output-connected drum 26 and connecting same to shaft 14 which transmits the engine torque. It is contemplated as a part of the present invention to replace the clutch 31—32 with a single-plate clutch such as shown in Fig. 4, and to connect the clutch hub 135 directly to a forward extension of shaft 50, for space economy. With this arrangement, the sleeve portion 79 of carrier 64 of Fig. 2 instead of being coupled to the drum 26 for driving shaft 50, is connected to, or forms a part of shaft 50. It is not deemed necessary to show a full detailed drawing of such an arrangement, hence the schematic drawing of Fig. 6 is given for a generalized instruction, since the required details are shown in the other figures.

The Fig. 7 arrangement is somewhat different from those of the preceding showings, but has a useful feature in the provision for engine braking.

The torque converter shown is of the six-element type, there being an auxiliary impeller I', a main impeller I, an auxiliary output rotor O', a main output rotor O, and two reaction wheels R and R'. In this version the auxiliary output rotor O' is attached to shaft 11, which drives sun gear 166. The rotor O is attached to hollow shaft 13 attached to carrier 171, which in turn is attached to the output shaft 50. The auxiliary impeller I' is coupled to the hub portion 3a of input drum 3 by the one-way clutch at Z.

The reaction wheels R and R' are prevented from backward rotation by one-way brakes A and B, the reaction torque being taken on sleeve 100e which is an extension of web 100a of the housing 100, the race portion 16 being like that of Fig. 1.

The annulus gear 167 meshes with the planets 173 spindled on carrier 171, and has a forward extension 167a of the drum 168 which provides one member 170 of the one-way clutch at Y, the other member at 176 being a sleeve portion of drum 174 equipped with brake band 175.

As in Fig. 5 the rear unit group at 166, 173, 167 is equipped with a reverse drive gear unit, coupled to the drum 168 in the identical manner.

The torque converter auxiliary impeller I' is shown as coupled by one-way clutch Z to the main impeller I, so that it may spin forward faster than the main impeller during high circulating velocity periods of the converter.

The operation of the Fig. 7 construction is simple. For initial drive, the rotor O' drives the sun gear 166, and when drum 168 receives a negative torque component, the one-way clutch at Y imparts the backward rotation to drum 174. If brakes 175 and 169 are both released there is only a fractional drive torque resulting from converter rotation, except insofar as the rotor O may be driven by whatever of a component its blades will absorb, by design, during a high circulation velocity interval.

Either brake 175 or 169 may be applied to obtain a forward component on output carrier 171. Normally brake 175 is applied for low gear drive, so that the second phase of converter drive is automatically brought about when carrier 171 comes up to a speed at which rotor O' idles and rotor O delivers second phase torque, the one-way clutch at Y permitting this action automatically, with brake 175 still applied. For engine braking on downhill driving, with the engine throttle at idle, band 169 may be used to hold the reaction annulus gear drum 168, the resulting overtaking component spinning rotor O' forward faster than rotor O.

It should be noted that during initial drive, rotor O' is spinning forward faster than rotor O, and impeller I' is spinning forward faster than impeller I. At a given relative speed condition when the circulating velocity diminishes, the auxiliary impeller I' is automatically locked to I by the one-way clutch Z, adding to the total impeller blade area. Also when a given differential speed point is reached, the speed of rotor O likewise rises to the point where it assumes the converter output torque, in the present instance, the output torque of shaft 50.

The Fig. 7 arrangement as noted above, permits this phase shift to occur by the action of the one-way brake 170—176 at Y. A further increase of drive ratio is obtained when the reverse torque component on rotors R and R' dies out under increased speed of rotor O, and these rotors begin to spin forwardly, released by the reaction brakes at A and B, and the converter drive ratio rises to one-to-one.

During this operation, it is possible for the component delivered by rotor O' to rise momentarily, when the vehicle slows down, during which operation, the increase of speed on sun gear 166 with respect to that of carrier 171 will spin annulus gear 167 backward, so that the unit Y may relock momentarily.

The foregoing description has referred to the use of the drive mechanisms of the invention to vehicles equipped with engines providing torques varying with throttle opening. While this is a commonly known feature, it should be emphasized that the present disclosed drive mechanisms provide a normal operation in which the idling speeds of the engines are not sufficient for the impeller rotations to generate useful drive torque, hence the need for the controlled main clutch of standard drive equipment is obviated, for the vehicles equipped with the present invention are initially started into motion by merely increasing the engine speeds above idling. This results in increase in quantity of impeller oil pumped, and therefore a rise in torque generated by the driven rotors. It has not been deemed necessary to show herein, a drawing of a throttle control for an engine, since such is commonly known.

The foregoing drive arrangements and modifications provide a broad scope of use of the invention herein, such that one skilled in the art could reproduce the benefits of the principles taught in a wide range of differing drive patterns, without departing from the spirit of the invention.

The fundamental teachings herein bear directly to the general problem of adapting the fluid torque converter of the turbine type to the performance and economy needs of the modern vehicle, and particularly the provision of plural and overlapping torque converter phases, which have the effect of extending the useful power ranges over which torque conversion occurs, this extension enabling a vehicle power drive to provide a full performance range matching that of the especially flexible modern automotive engine. The various advantages stemming from this concept are believed clearly demonstrable by the disclosures described herein, such that persons skilled in the art may reproduce the useful results described.

It should be clearly understood that the invention herein is not to be restricted in any sense to the specific structures described, and that the true scope of the invention is as defined in the appended claims.

I claim:

1. In a combined power drive comprising a fluid torque converter and a variable planetary gear train, a load shaft, a fluid torque converter having a turbine working space including a power-driven impeller, a pair of output rotors arranged sequentially in the outflow path of said impeller consisting of a first rotor operative at high circulatory fluid velocity and a second rotor, and a releasable reaction rotor operative to provide reaction torque and located between the outflow of the second of said pair of rotors and the inflow to said impeller, said planetary gear train consisting of two units arranged to drive the said shaft, the first of said units having two input members each connected to one of said rotors and the second of said units having an input member fixed to rotate with one of said first unit input members, a reaction member for said second unit equipped with braking mechanism adapted to prevent backward rotation of said reaction member, and a one-way locking device operative to cause uncoupling of the torque of said first rotor when said second rotor is delivering full torque to its gear train input member.

2. In the combination set forth in claim 1, the subcombination of an arrangement of the said impeller and rotors with the impeller in the outflow zone of said working space, with the said second output rotor in the inflow zone thereof, with the said first output rotor in the outward radial zone between said impeller and the said second rotor, and with the said reaction rotor in the inward radial zone between said impeller and second rotor.

3. In the combination set forth in claim 1, the subcombination of said first of the units of the gear train including a sun gear as one input member connected to said first rotor, and a carrier as the other input member connected to provide torque for driving said load shaft, said carrier being driven by said second output rotor.

4. In the combination set forth in claim 1, the subcombination of said braking mechanism for said reaction member being operative to initiate the drive of the said load shaft for one phase of drive operation and said device being operative to permit the uncoupling of the torque of said first rotor for a second phase of drive operation, when said mechanism remains operative to prevent rotation of said reaction member.

5. In the combination set forth in claim 1, the subcombination of a direct-coupling clutch adapted to establish one-to-one drive between said power-driven impeller and said shaft, and control operative to release the said braking mechanism for said gear train reaction member while engaging said clutch and operative to apply the said mechanism when said clutch is disengaged.

6. In the combination set forth in claim 1, the subcombination of a fluid pressure servo system with supply pumps for feeding fluid to said converter working space, a clutch adapted to connect the impeller and said shaft, servo actuation means for said reaction member braking mechanism and said clutch with control valving for selective operation of said braking mechanism, and an arrangement of said system and said valving operative to release said mechanism and cause engagement of said clutch in one operative valve position, and operative to apply said brake mechanism and cause release of said clutch, in a second operative position.

7. In a combined torque converter and gear train drive effective to couple an engine shaft and a load shaft at variable speed and torque ratios; a fluid torque converter with a turbine working space in which are sequentially located an impeller connected to said engine shaft, a first output rotor, a second output rotor and a reaction rotor equipped with a releasable one-way locking device, said impeller and rotors causing a circulating fluid body in said space to generate torque, a planetary gear train consisting of a plurality of gear and carrier members, a driven member of which is connected to said load shaft, one member connected to said first rotor, a third member connected to said second rotor and a fourth member arranged to be held for providing forward drive torque reaction for said train with friction braking means actuable to hold said fourth member; and a second friction braking means for said third member actuable to hold same and provide reverse drive of said load shaft when said first-named braking means is released.

8. In the combination set forth in claim 7, the subcombination of a one-way clutch in the connection between said first rotor and said connected gear train member, operative to release the torque transmitted through said connection when the said second rotor is delivering a predetermined torque to its corresponding gear train member.

9. In the combination set forth in claim 7, the subcombination of an engine connected shaft, a clutch hub fixed to said shaft, a carrier member of said gear train connected to said driven member, a drum connecting said gear train driven member carrier with said load shaft, clutch plates mounted inside said drum mating with clutch plates mounted on said hub, control means including fluid pressure actuator mechanism for loading and releasing the engine torque of said plates, and control means including fluid pressure actuators individually operative upon said forward and reverse braking means coordinated to provide selective actuation of each of said clutch or said two braking means.

10. In the combination set forth in claim 7, the subcombination of said gear train driven member consisting of a planetary-carrier, said gear train first rotor-connected member consisting of a pair of sun gears, said second rotor-connected member consisting of a carrier, and said forward-drive reaction member consisting of an annulus gear, wherein the stated arrangement provides an initial drive ratio range when said fourth member braking means is actuated and said first rotor receives torque from said impeller delivering same to said pair of sun gears, and provides a secondary drive ratio range when said fourth member braking means remains actuated and said second rotor receives torque from said impeller delivering same to said carrier.

11. In the combination set forth in claim 7, the subcombination of a one-way clutch in the connection between the first rotor and its connected gear train member, for releasing the torque therebetween when the said second rotor is driving its connected gear train member at a reduction ratio, a controllable clutch with an actuator operative to couple said shafts during intervals when said reaction rotor locking device is not subject to the reaction torque generated in said fluid body, and control apparatus for said clutch actuator and for the fourth member braking means effective to alternate same for direct or reduction drive.

12. In combined fluid turbine and gear train power transmissions, a power shaft and a load shaft, a torque-combining gear train arranged to drive said load shaft through an output member and having two input members, said train being equipped with reverse drive establishing elements, a fluid turbine device with two output rotors connected to drive the said input members of said train, a reaction element of said train arranged to provide initial forward speed reduction drive, a stage of intermediate forward speed ratio drive and a clutch mechanism effective to provide one-to-one drive between said shafts, said device having an impeller member driven by said powershaft, a one-way clutch located between one of said rotors and its gear train input member for transmitting the torque of the rotor thereto, control apparatus actuating said reaction element for providing said torque reaction for said initial and intermediate speed ratio drives of said device, and selectively operable torque-controlling means for said gear train operative upon said apparatus to establish the said initial forward drive, to maintain the said intermediate forward drive, and operative upon said apparatus to disengage the said forward drives and operative upon said mechanism to select direct drive between said shafts.

13. In a fluid torque converter for coupling a power shaft to plural output shafts, rotating members blading a working space for a recirculating fluid body operative thereby at variable circulating velocities in said working space, said space having inward and outward radial zones and outflow and inflow zones, said members including an impeller connected to said power shaft and located in the said outflow zone, a pair of independently rotatable output rotors following said impeller in the normal direction of motion of said impelled fluid body the first of said rotors being located in said outward zone and the second rotor being located in said inflow zone, said rotors being bladed so as to transmit torque in the same direction of rotation as said impeller, and a reaction rotor located in said inward zone and adapted to receive the outflow from the second of said output rotors and deliver same to the inlet of said impeller for recirculation in the same sequence through the said working space.

14. In the combination set forth in claim 13, the subcombination of said output rotors being formed to provide differential torques to said output shafts, a torque combining planetary reduction gear train with two input members driven by said shafts and having an output member driving a load shaft, and a one-way reaction locking means for said reaction rotor effective during forward drive of said converter output shafts to establish torque-multiplied drive of either of said converter output shafts and consequently reduction drive of said load shaft, and said one-way reaction locking means being further effective to release said reaction rotor at a predetermined circulating velocity of said fluid body and to permit said reaction rotor to rotate forwardly during intervals of approximate one-to-one drive between said impeller member and said output rotors.

15. In the combination set forth in claim 13, the sub-combination of a torque-combining gear train consisting of a planetary gearing embodying primary sun gears and a primary carrier and a second carrier driving a load shaft, said train having plural input members connected to said sun gears and said first carrier joining same to one of said converter output rotors, reaction elements of said train operative to establish forward or reverse drive of said load shaft, and a plurality of gear train reaction-controlling mechanisms individually operative upon said reaction elements to provide said forward or reverse drive of said load shaft.

16. In combined fluid and gear drive transmissions, the combination of power and load shafts to be coupled by a fluid torque converter driven by said power shaft and having plural output rotors, and coupled by a changeable gear train driving said load shaft and having plural input members connected to said rotors, a fluid body in a toroidal fluid working space of said converter in which bladed portions of said rotors lie, a peripheral zone of said space for one of said rotors connected to one of said members, an inflow zone of said space for a second of said rotors connected to another of said rotors, a one-way clutch adapted to couple one of said rotors with its gear train member and to permit the member to run faster than its rotor, and selective control mechanism for said rotors and for changing said gear train, effective to provide a plurality of forward drive ratio ranges at reduced speeds of said load shaft with respect to the speed of said power shaft.

17. In the combination set forth in claim 16, the sub-combination of said gear train embodying a reverse drive path established by stopping rotation of a reaction member of said train, reverse drive reaction mechanism, and a reverse drive control operative to set aside the selection of the said forward plural-range drive, and to establish reverse drive by energizing said reaction mechanism, said drive being provided by one of said rotors in one range of reduced speed ratio.

18. In combined fluid turbine and gear train power transmissions, a power shaft and a load shaft, a torque-combining gear train composed of two planetary units, each of the units having the elements of a sun gear, meshing planet gears, a carrier for the planet gears and an annulus gear, a drive pattern of the elements consisting of one torque input member common to each of said sun gears, a second torque input member adapted to drive the carrier of said first unit, the output member of the train being the carrier of the second unit connected to said load shaft, braking mechanism to stop and hold the second unit annulus gear, braking mechanism similarly operative to stop and hold the first unit carrier, a fluid turbine drive unit having an impeller attached to said power shaft and having two driven rotors located sequentially in the path of flow from said impeller, the first rotor of which is connected to said sun-gear-connected gear train input member, the second rotor of which is connected to the said second input torque member of said train, and a one-way clutch located in the connection of said first rotor with said sun gears operative to establish that connection under the torque delivered by said first rotor and operative to release the said connection in the drive interval during which the said second rotor is delivering torque when said first-named braking mechanism is holding said annulus gear.

19. In power transmissions and controls therefor, driven by an engine having a throttle control operable to vary its effective torque and speed, the combination of an engine-connected driving drum, a gear transmission assembly, a primary input shaft, a secondary input shaft, a driven shaft, a first planetary gear unit of said assembly consisting of a sun gear attached to said first-named shaft, meshing planet gears supported on a carrier fixed to said secondary shaft and a meshing annulus gear rotating with said driven shaft; a second planetary unit of said assembly consisting of a sun gear also attached to said first-named shaft, meshing planet gears supported on a carrier rotating with said driven shaft, and a meshed annulus gear; braking mechanisms for each of said first unit carrier and second unit annulus gear, a fluid turbine device consisting of a plurality of bladed members forming a toroidal circulating working space for a fluid body, said device embodying an impeller member driven by said drum, a first rotor located to receive the outflow from said impeller and to transmit a predetermined range of torques therefrom to said primary input shaft, a second rotor located to receive the inflow from said first rotor and to transmit a different predetermined range of torques therefrom to said secondary input shaft, and a one-way clutch in the connection of said first rotor with said primary input shaft operable to provide initial torque to said assembly when either of said braking mechanisms is made effective upon operation of said throttle to increase the effective torque of said engine.

20. In the combination set forth in claim 19, the sub-combination of a reaction brake in said mechanism for said second unit annulus gear, a fluid pressure operated piston adapted to actuate said brake to stop and to hold said annulus gear, a friction clutch adapted to connect said engine and driven shaft with a fluid pressure operated piston for actuating same subject to the pressure of said fluid body, and a control valve connected to deliver fluid pressure to operate said clutch piston to hold said clutch released while delivering pressure to said brake piston to apply the said reaction brake, and connected to cut off said fluid pressure from said pistons and permit the said clutch to re-establish the drive between the engine and said shaft as actuated by the pressure of said fluid body.

21. In the combination set forth in claim 19, the sub-combination of a reaction brake for said second unit annulus gear, a fluid pressure operated piston adapted to actuate said brake to stop and hold the annulus gear against rotation, a pump supply, a friction clutch adapted to connect said engine and driven shaft, a spring for releasing said clutch, a fluid pressure moved piston arranged to overcome said spring and engage said clutch, a pressure space connected to said supply and providing pressure therefrom to engage said clutch, a second pressure space adapted to provide counterbalancing pressure on said piston to that of said first pressure space and thereby effective to permit said spring to disengage said clutch, a control valve connected in one position to deliver fluid pressure from said supply to operate said brake piston while delivering fluid pressure from said supply to said second clutch pressure space, for establishing one drive condition in which said brake is applied and said clutch released, and said valve being effective in another position to cut off fluid pressure from said brake piston and said second clutch pressure space to release the said brake and permit the pressure of said first pressure space to engage the said clutch.

22. In power transmissions and controls for same, the combination of a variable ratio drive assembly for transmitting a range of variable torques from an engine-driven shaft to a load shaft, said assembly including a fluid turbine drive device coupled to a differential planetary gear train so as to provide said range of variable torques, reaction elements for said gear train operative to establish selective forward and reverse drive between said shafts, braking mechanisms for rendering said elements separately effective, an actuator for one of said brake mechanisms consisting of a cylinder and a piston moved by fluid pressure, a clutch adapted to connect said shafts, actuator means for said clutch including a piston and pressure actuator spaces on either side of said piston and including a clutch releasing spring, a fluid pressure supply space, a control valve arranged to deliver the pressure of said supply space to a conduit connected to one of said pressure spaces and to said brake cylinder, a fluid pressure connection from said supply space to the other of said clutch pressure spaces normally effective to cause engagement of said clutch against the force of said clutch spring, and a control operative to position the said valve to deliver pressure to said brake cylinder and to said first named clutch pressure actuator space for applying said brake actuator while establishing counterbalancing pressure in said second actuator space for permitting said spring to disengage the said clutch, said control being effective to position the said valve for relieving the said brake cylinder pressure and the said first named actuator space pressure thus permitting the said second actuator space pressure to engage the said clutch.

23. In the construction described in claim 22, the sub-combination wherein said device includes a driving drum, a circulating fluid body, a driving impeller rotor connected to said drum, and driven turbine rotors within said drum; blading for said rotors operative to generate and to transmit torque and having blades located in a common working space, a pump for providing fluid pressure for said supply space, a connection from said supply space to the interior of said drum for maintaining a positive pressure by said body in said drum and in said working space, and an arrangement of said drum, said clutch actuator piston and said second clutch actuator space so that the pressure within said drum is effective to operate said clutch piston to engage the said clutch against the force of said clutch releasing spring.

24. In combined fluid turbine and gear train power transmissions, a power shaft and a load shaft, a torque-combining gear train arranged to drive said load shaft through an output member and having two input members, said train being equipped with reverse drive establishing elements, a liquid torque transmitting device with two output rotors connected to drive the said input members of said train, a reaction element in said train arranged to provide initial forward speed reduction drive, a stage of intermediate forward speed ratio drive, and a clutch effective to provide one-to-one drive between said shafts, said clutch having its input element connected to said power shaft and its output element connected to a member of said gear train, said torque transmitting device having an impeller member driven by said powershaft, a one-way clutch located between one of said output rotors and its gear train input member, control apparatus for causing said reaction element to provide torque reaction for said initial and intermediate speed ratio drives of said device, and selectively operable torque-controlling means for said gear train operative upon said apparatus to establish the said initial forward drive, to maintain the said intermediate forward drive, and operative upon said apparatus to disengage the said forward drives and operative upon said clutch to establish direct drive between said shafts.

25. A power transmission comprising a driving member, a driven member, a fluid power transmitting unit interposed between the driving and driven members including a pump coupled directly to the driving member, a primary turbine member, a secondary turbine member directly coupled to the driven member, and a reaction member, each of the pump, turbine and reaction members having blades of predetermined configuration mounted thereon, a planetary gear train, one element of which is directly affixed to the primary turbine, another element of which is supported for rotation on the secondary turbine and yet another element of which is inhibited from reverse rotation, and means for inhibiting reverse rotation of the reaction member.

26. In a combined power drive comprising a fluid torque converter and a planetary gear train, a load shaft, a bladed fluid torque converter having a fluid working space in which a body of fluid circulates radially and circumferentially, said converter including a power-drive impeller, a pair of output turbine rotors arranged sequentially in the radial outflow path of fluid from said impeller and a releasable stator operative to redirect said fluid and located between the radial outflow of the second of said pair of turbine rotors and the radial inflow to said impeller, said planetary gear train being arranged to drive the load shaft and having two torque-transmitting members each connected to one of said turbine rotors, a third member of said gear train equipped with braking mechanism adapted to prevent backward rotation of said third member, and a connection from one of said members and its turbine rotor to said shaft operative to transmit the torque of said latter rotor directly to said shaft.

27. In the combination set forth in claim 26, the sub-combination of an arrangement of the impeller and turbine rotors having the impeller located in the radial outflow zone of said working space, with the said second output turbine rotor in the radial inflow zone thereof, with the said first output rotor located in the outward radial zone in the fluid flow path between said impeller and the said second rotor, and with the said reaction rotor located in the inward radial zone between said impeller and second turbine rotor, and said planetary gear train having a sun gear as one input member connected to said first rotor, and having a planet gear carrier connected to drive said load shaft.

28. In the combination set forth in claim 26, the sub-combination of a casing for said gear train, and said braking mechanism for said third member being operative to initiate the drive of the said load shaft for one phase of drive operation and a one-way device connected to prevent relative rotation of said braking mechanism with respect to said casing.

29. In a combined torque converter and gear train drive arranged to couple an engine shaft and a load shaft at variable speed and torque ratios; a bladed fluid torque converter having a turbine working space in which a body of fluid circulates radially and circumferentially, and in which are located sequentially in the path of fluid flow, an impeller connected to said engine shaft, a first output turbine rotor, a second output turbine rotor, and a stator equipped with a releasable one-way locking device, said impeller and output rotors causing said circulating fluid body in said space to generate and transmit torque, a planetary gear train consisting of a plurality of gear members with a driven planet gear carrier which is connected to said load shaft and to one of said turbine rotors, a first gear member connected to said first rotor, planet gears on said carrier meshing with said gear member, a second gear member having teeth meshing with said planet gears and connected to a brake drum, braking means for said drum arranged to be engaged for providing forward drive torque reaction on said second gear member of said train, said braking mechanism for said drum braking means consisting of a first and a second braking element both operative to provide reduction gear drive of said load shaft.

30. In combined fluid torque converter and gear train power transmissions, a power shaft and a load shaft, a torque-combining planetary gear train arranged to drive said load shaft and having a reaction supporting element; a fluid torque converter driving said train and said load shaft and adapted to provide successively initial forward speed reduction drive, a stage of intermediate forward speed ratio drive and substantially one-to-one drive between said shafts; said converter having an impeller member driven by said powershaft, a plurality of driven turbine rotor members one of which is connected to an input element of said gear train and another of which turbine rotors is connected to said load shaft, and a one-way rotating reaction member for providing torque reaction for said initial and intermediate speed ratio drives of said converter; and controlling means for braking said reaction supporting element of said gear train selectively to establish the said initial forward drive.

31. In a power transmission in combination, a fluid torque converter coupling a power shaft to plural driven shafts, said torque converter including an impeller connected to said power shaft and adapted to circulate a fluid, a pair of turbine rotors in the path of said circulating fluid and connected to said driven shafts respectively a reaction member adapted to receive the outflow from the second of said turbine rotors and deliver same to the inlet of said impeller, said turbine rotors providing differing torques upon their respective shafts; and a torque combining gear train with two torque-transmitting members driven by said driven shafts, one of said members being adapted to drive a load shaft, and a one-way reaction locking means for said reaction member effective during forward drive of said turbines to establish torque-multiplied drive of either of said driven shafts and consequently reduction drive of said load shaft through said train, said one-way reaction locking means being further effective to release said reaction member at a predetermined circulating velocity of said fluid body and to permit said reaction stator to rotate forwardly during intervals of approximate one-to-one drive between said impeller member and said output turbine rotors.

32. In combined fluid and gear drive transmissions, the combination of power and load shafts to be coupled by a fluid torque converter having an impeller driven by said power shaft, plural output turbine rotors, and a reaction rotor; a torque combining, planetary gear train having an element connected to drive said load shaft and having plural input shaft members connected to said turbine rotors, selective control mechanism for said gear train effective to provide a plurality of forward drive ranges at reduced speeds of said load shaft with respect to the speed of said power shaft, and a particular arrangement of said train consisting of a planet gear carrier connected to said load shaft, planet gear elements supported on said carrier, a sun gear and an annulus gear meshing with said planet gear elements, one of which gears is connected to be driven by one of said rotors and its corresponding shaft member, and the other of which is adapted selectively to be braked against rotation for establishing forward drive torque reaction in said train.

33. In a power transmission drive mechanism, an engine shaft, a driven shaft, a fluid torque converter of the turbine type and a gear train cooperating with said converter to couple said shafts at variable speed ratios, plural gear elements in said train, a drive connection from the output of said converter to one of said elements, a fluid pressure working space in said converter, a fluid pressure supply for said working space, a friction clutch adapted to connect said engine shaft to an element of said gear train for providing effective direct drive between said shafts, said clutch having a member rotating with said element and an expansible chamber motor subject to the action of fluid pressure to set the clutch, releasing springs for said clutch, one of said members being of piston form and axially moved by the pressure in said working space acting against said springs to provide said gripping action, the other of said members being a backing plate for said gripping action, a fluid pressure cylinder space in which the fluid pressure opposes said gripping action by said one member, and a directing control for delivering pressure to or exhausting same from said cylinder space, operative to provide equalizing pressure in said cylinder space for permitting said springs to release said clutch, or operative to drain said cylinder space and permit the said working-space pressure to cause said one member to grip the said plate against the force of said springs.

34. In a power drive comprising a fluid torque converter and a planetary gear train, the combination of a load shaft, a fluid torque converter having an input impeller, a pair of output rotors and a releasable reaction rotor located between the second of said pair of rotors and said impeller, said planetary gear train consisting of two units arranged to drive the load shaft, the first of said units having two input members each connected to one of said rotors, and the second of said units having an input member fixed to rotate with one of said first unit input members, a reaction member for said second unit equipped with braking mechanism adapted to prevent backward rotation, and a one-way clutch between said first rotor and its connection to the planetary gear train.

35. In a combined power drive in combination a fluid torque converter having an input impeller, a pair of output rotors arranged sequentially in the out-flow path of said impeller torque and a releasable reaction rotor operative to provide reaction and located between the outflow of the second of said pair of rotors and the impeller; a gear train including two units arranged to drive said shaft, the first of said units having two input members each conected to one of said rotors and the second of said units having an input member fixed to rotate with one of said first unit input members, a reaction member for said unit equipped with braking mechanism adapted to prevent backward motion of said reaction member and a one-way clutch between the first rotor and its connection to the gear train.

36. A power transmission comprising a driving member, a driven output load member, a fluid power transmitting unit interposed between the driving and driven output load members including a pump coupled directly to the driving member, a primary turbine member, a secondary turbine member directly coupled to the driven output load member, and a reaction member, each of the pump, turbine and reaction members having blades of predetermined configuration mounted thereon, a planetary gear train, one element of which is directly affixed to the primary turbine, another element of which is supported for rotation on the secondary turbine and yet another element of which provides reaction for said planetary gear train, brake means for preventing reverse rotation of said reaction element of said gear train, and other brake means for preventing reverse rotation of said reaction member.

37. Apparatus for transmitting torque from a driving shaft to a driven load shaft comprising a torque converter having an impeller driven by and rotating with said driving shaft, a plurality of rotatable turbine rotors, and a reaction rotor inhibited against rotation in a direction reverse to that of impeller rotation, planetary gearing having a driven element connected to said driven load shaft, and a reaction element for forward drive, each of said turbine rotors being connected to drive different elements of said planetary gearing to transmit torque through said planetary gearing to said driven load shaft at different ratios, and a clutch operable to establish direct drive between said driving shaft and said driven load shaft.

38. Apparatus for transmitting torque from a driving shaft to a driven load shaft comprising a torque converter having an impeller driven by and rotating with said driving shaft, a plurality of rotatable turbine rotors and a reaction rotor inhibited against rotation in a direction reverse to that of impeller rotation, planetary gearing having a driven element connected to said driven load shaft, and a reaction element for forward drive, one of said turbine rotors being connected to drive an element of said planetary gearing to initially transmit torque through said planetary gearing to said driven load shaft at predetermined ratio, another of said turbine rotors being connected to drive another element of said planetary gearing to subsequently transmit torque through said planetary gearing to said driven load shaft at different ratio, and a clutch operable to establish direct drive between said driving shaft and said driven load shaft.

39. Apparatus for transmitting torque from a driving shaft to a driven load shaft comprising a torque converter having an impeller driven by and rotating with said driving shaft, first and second rotatable turbine rotors and a reaction rotor inhibited against rotation in a direction reverse to that of impeller rotation, planetary gearing having a driven element connected to said driven load shaft, and a reaction element for forward drive, the first of said turbine rotors being connected to drive a first driving element of said planetary gearing, the second of said turbine rotors being connected to drive a second driving element of said planetary gearing, said first turbine rotor initially transmitting torque through said planetary gearing to said driven load shaft at predetermined ratio and compelling rotation of said second driving element and said second turbine rotor, said second turbine rotor subsequently transmitting torque through said planetary gearing to said driven load shaft at different ratio, and a clutch operable to establish direct drive between said driving shaft and said driven load shaft.

References Cited in the file of this patent

UNITED STATES PATENTS

| | | |
|---|---|---|
| 2,015,300 | Dell et al. | Sept. 24, 1935 |
| 2,203,177 | Patterson | June 4, 1940 |
| 2,298,648 | Russell | Oct. 13, 1942 |
| 2,312,849 | Pollard | Mar. 2, 1943 |
| 2,325,876 | Pollard | Aug. 3, 1943 |
| 2,326,994 | Duffield | Aug. 17, 1943 |
| 2,381,772 | Pentz | Aug. 7, 1945 |
| 2,456,328 | Schneider | Dec. 14, 1948 |
| 2,578,450 | Pollard | Dec. 11, 1951 |
| 2,584,965 | McFarland | Feb. 5, 1952 |